Sept. 19, 1961 G. BURROWS 3,000,650
VEHICLE FRAME
Filed Sept. 26, 1957 2 Sheets-Sheet 1
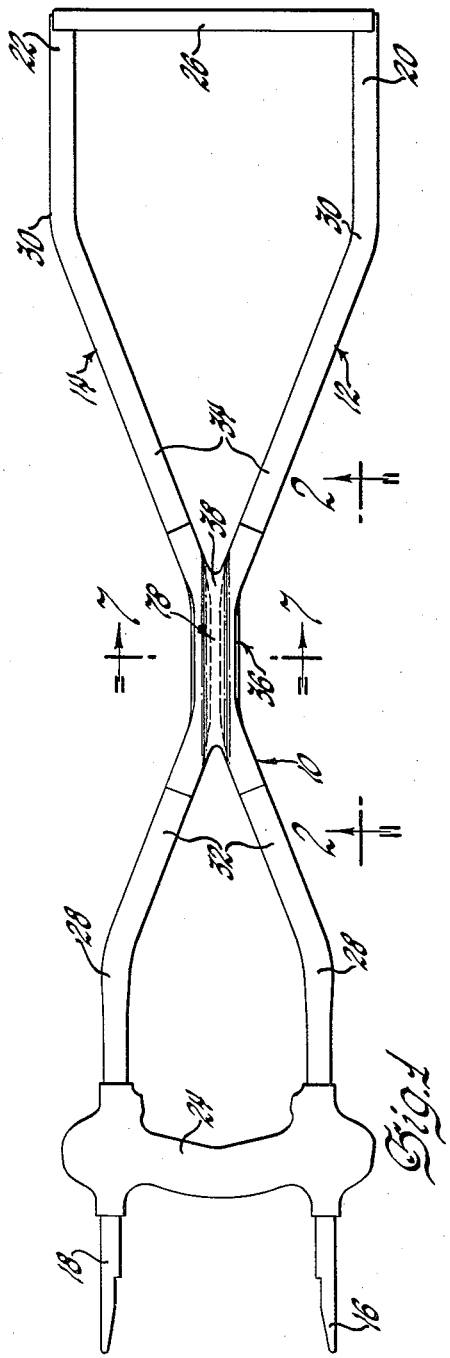
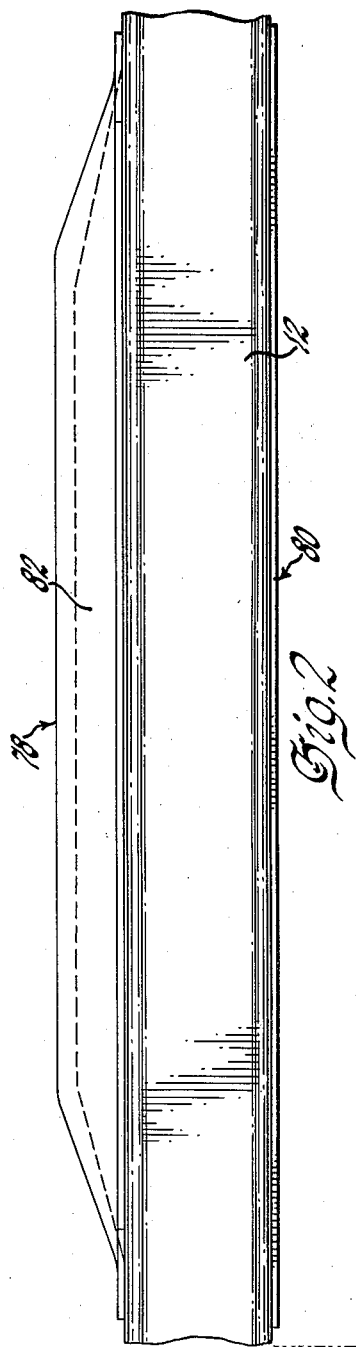
INVENTOR.
Godfrey Burrows
BY
ATTORNEY Sept. 19, 1961 G. BURROWS 3,000,650
VEHICLE FRAME Filed Sept. 26, 1957 2 Sheets-Sheet 2

INVENTOR.
Godfrey Burrows
BY
L D Burek
ATTORNEY

United States Patent Office 3,000,650
Patented Sept. 19, 1961

3,000,650
VEHICLE FRAME
Godfrey Burrows, Flint, Mich., assignor to General Motors Corporation, Detroit, Mich., a corporation of Delaware
Filed Sept. 26, 1957, Ser. No. 686,393
8 Claims. (Cl. 280—106)

The invention relates to a frame for an automotive vehicle and more particularly to a frame of the cruciform type in which the frame rails are formed from tubular stock. The tubular stock for the rails may be rolled and seam welded to a generally rectangular cross section and further formed by any convenient means such as mandrels to provide the desired frame ends. In order to obtain the cruciform conformation of the frame, the center section of each of the rails is depressed in a generally horizontal plane to provide a center portion which is substantially parallel to the frame longitudinal axis and the frame end portions as viewed in that plane. Cross members may be secured adjacent either end of the frame rails to tie the ends together. The depressed center portions are then positioned adjacent each other and may be secured together to form the cruciform frame.

A vehicle drive shaft tunnel section is provided at the center portion of the frame to permit the vehicle drive shaft to pass through the frame at that point without interference. It has been long known to provide drive shaft tunnels through the center section of a frame having an X conformation. Such tunnels are usually provided by interrupting the rails at the intersection and substituting plates for this portion of the side rails, the plates being secured together in a manner similar to an open end box to define the shaft tunnel. Reinforcing channels have also been provided intermediate the end portions of the frame rails to add additional strength at this point.

It is now proposed to form the tunnel for receiving the vehicle drive shaft at the cruciform intersection of the frame by using tubular frame rails in which the rail inner walls are backed against the rail outer walls at the center portion to form a passage through the frame when the rails are secured together at this point. Thus a tubular cruciform frame may be provided in which the tubes are not cut at any point to provide a tunnel section. In such a frame the advantage of a channel side rail is obtained from a tubular rail with the tunnel section being integral with the remaining portions of each of the rails. While the rails may be joined together in abutting relation at this point, it is preferable to provide upper and lower tunnel plates which may be welded or otherwise secured to the rails and operate to hold the rails in spaced relation.

In the drawings:

FIGURE 1 is a plan view of a cruciform frame embodying the invention;

FIGURE 2 is a side view of a portion of the frame of FIGURE 1, taken in the direction of arrows 2—2 of that figure and having parts broken away;

Figure 3:
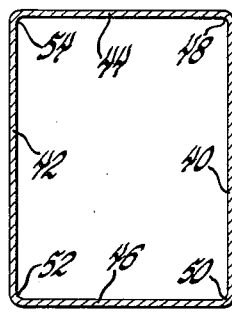
FIGURE 3 is a cross section view of one side of the frame of FIGURE 1 taken at the center section thereof prior to the forming of the rail to provide a portion of the tunnel section.

Referring now to the drawings, the vehicle frame 10 illustrated in plan view in FIGURE 1 includes tubular members 12 and 14 which may be formed as frame side rails. These rails are formed at the front ends 16 and 18 and the rear ends 20 and 22 to provide the desired frame end conformations and may be interconnected adjacent these ends by cross members 24 and 26. As is best illustrated in the plan view of FIGURE 1, which shows the frame in a horizontal plane, each rail is bent inwardly at points 28 and 30 to provide diagonal rail sections 32 and 34. The center portion 36 of each of the rails interconnects diagonal sections 32 and 34 and is generally parallel to the longitudinal axis of the frame. These center portions are operatively connected to form a drive shaft tunnel section 38 and give the frame its cruciform conformation. There is an intersection of the extended diagonal rail section center lines through this junction, although the rails themselves do not cross over at this point.

Although the rails may be secured directly together, as is common in some channel section frames, it is preferable to secure them in spaced relation and provide upper and lower cover plates which are secured by welding or other means to the rails. These cover plates then define the upper and lower walls of the shaft tunnel and the rails define the side walls of the tunnel.

The cross section views of rail 12 illustrated in FIGURES 3 through 6 of the drawings show the rail in various stages of manufacture by which the tunnel section is obtained. Each of the rails is similarly formed and the following description of the forming of rail 12 is also applicable to the forming of rail 14, with the latter rail being oppositely formed, as is readily understood.

Figure 4:
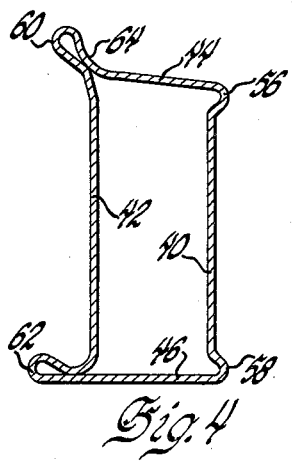
FIGURE 4 illustrates an intermediate step in forming a frame rail to provide a tunnel section.
Figure 5:
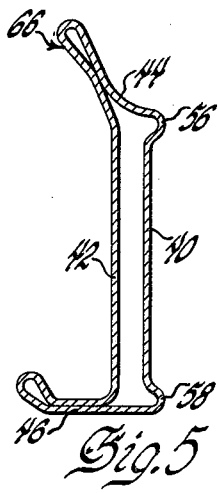
FIGURE 5 illustrates another intermediate step in forming the frame rail to provide a tunnel section.
Figure 6:
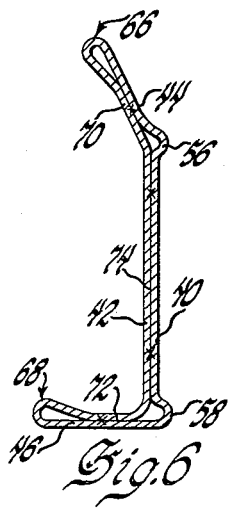
FIGURE 6 illustrates a final step in forming the rail to provide a tunnel section.

The center section of rail 12 is rectangular in cross section and has an outer side wall 40, an inner side wall 42, an upper wall 44, and a lower wall 46. These walls are integrally formed with and connected by corner sections 48, 50, 52, and 54 to define the rectangularly formed tubular cross section. The center section 36 of rail 12 is formed to provide one of the walls of the tunnel section 38. The tubular rail is shaped to a generally channel shaped cross section without cutting away any portion thereof. Side wall 40 may be depressed inwardly of the rail a small amount as shown in FIGURE 4 to provide reinforcing ribs or beads 56 and 58 at the corners 48 and 50. At the same time, or in a separate operation, side wall 42 is depressed inwardly to fold upper wall 44 and lower wall 46, as is illustrated at 60 and 62. Upper wall 44 may also be deflected upwardly as is illustrated at 64. The net result of the folding of the upper wall 44 and the depression of side wall 42 is the upward and outward deflection of upper wall 44 to provide a folded arm 66 which extends at an obtuse angle from side walls 40 and 42. Lower wall 46 is folded to form a channel arm 68 which may extend substantially at right angles to side walls 40 and 42. The continued depression and folding operations cause side wall 42 to contact side wall 40 at their inner surfaces substantially through their full areas at 74, as is illustrated in FIGURE 6. The sides of channel arm 66, which are formed from upper wall 44, also contact along their inner surfaces as is shown at 70 in FIGURE 6. Similarly, channel arm 68 has the inner surfaces thereof contacting each other at 72. A generally L or channel shaped cross section is therefore formed from a tubular member by backing one of the side walls against the other side wall and folding the upper and lower walls to provide channel arms. Reinforcing ribs are provided at either edge of the side walls and the channel arms terminate in folds which also act as reinforcing ribs along the edges thereof. The contacting surfaces may be spot welded at 70, 72, and 74. These welds may be positioned at any portions of the contacting areas. By using the forms herein illustrated and described, however, this welding operation is not necessary to provide sufficient frame strength and may be dispensed with if desired.

Figure 7:
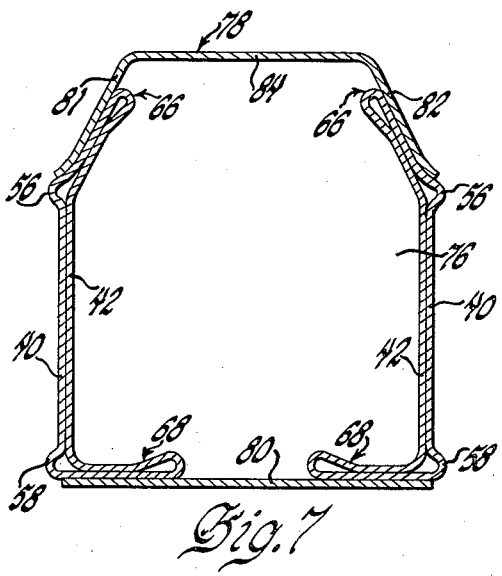
FIGURE 7 is a cross section view of the completed frame taken at the tunnel section in the direction of arrow 7—7 of FIGURE 1.

As is best seen in FIGURE 7, the rails 12 and 14 may be secured together to provide the tunnel passage 76. While the rails may be secured directly together to provide such a passage, it is preferable to secure them in spaced relation by means of upper cover plate 78 and lower cover plate 80. The upper cover plate may be generally formed as an open inverted channel having its side walls 81 and 82 extending angularly outward from its top wall 84 so that the side walls are in surface contact with the outer surfaces of the angled channel arms 66 formed on rails 12 and 14. The cover plate 78 therefore provides a cap for tunnel section 76 as well as providing means for securing rails 12 and 14 together. Lower cover plate 80 may take the form of a flat plate which engages the lower surfaces of arms 68 formed from rails 12 and 14. The cover plates may be secured to the rails by any convenient means such as welding.

A vehicle frame having a cruciform conformation has thus been provided which is manufactured from tubular rails of substantially rectangular cross section. A drive shaft tunnel section has been provided by forming the tubular rails to define the tunnel section without the necessity of cutting the tubular frame or welding additional sections to a channel frame. The tunnel section may also be provided at the inner section of diagonal bracing members used in a parallel side rail frame as well as in a cruciform frame.

What is claimed is:

1. In a vehicle frame having tubular side rails formed at each end thereof to provide frame ends and operatively secured together in spaced relation at the center section thereof to provide an X-shaped frame, a drive shaft tunnel section comprising side walls and a top cover and a bottom cover secured to said walls, said side walls being formed from said tubular side rails, each of said side rails having its inner side wall folded outwardly throughout said tunnel section and backed against its outer side wall at said tunnel section to define said tunnel section side walls.

2. A vehicle frame having tubular rails operatively secured together and defining an X-shaped section, said rails having their inner walls disposed outwardly against their outer walls throughout the central portion of said section, said rails thereby defining a drive shaft tunnel through said section.

3. In a frame for an automotive vehicle, first and second side rails having a tubular cross section intermediate the ends thereof, said side rails being inwardly disposed toward each other in spaced relation and having upper and lower reinforcing plates securing said rails together at the center portions thereof to define a cruciform center section including a shaft tunnel, said rails having their inner walls outwardly disposed toward their outer walls throughout said center section to define the side walls of said tunnel, said reinforcing plates for said center section defining the upper and lower walls of said tunnel.

4. A method of forming a shaft tunnel in a vehicle cruciform frame section comprising the steps of forming tubular side rails of substantially rectangular cross section, forming said side rails inwardly at their center sections to a cruciform conformation, folding the inner side walls of each of said rails substantially throughout the center sections thereof into area contact with the outer side walls of said rails, and securing said rails together in spaced relation to define said shaft tunnel intermediate said rails.

5. A method of manufacturing a cruciform vehicle frame having a drive shaft tunnel passing through the center section thereof, said method comprising the steps of forming a pair of tubular rails having a rectangular cross section, displacing the center sections of said rails horizontally to provide center portions generally parallel to and offset from the end portions thereof, depressing the outer side wall of each of said rail center portions to form a reinforcing bead at the upper and lower edges thereof, depressing the inner side wall of each of said rail center portions to fold said wall into planar contact with said outer wall, and securing said rails together at said generally parallel center portions with the inner side walls thereof in spaced relation to define a cruciform frame having a shaft tunnel defined by said depressed and folded side wall center portions.

6. A method of manufacturing a cruciform vehicle frame having a drive shaft tunnel passing through the center section thereof, said method comprising the steps of forming a pair of tubular rails having a rectangular cross section, displacing the center sections of said rails horizontally to provide center portions generally parallel to and offset from the end portions thereof, depressing the outer side wall of each of said rail center portions to form a reinforcing bead at the upper and lower edges thereof, depressing the inner side wall of each of said rails center portions to fold said wall into planar contact with said outer wall and forming folded channel sides from the upper and lower walls of each of said rail center portions, and securing said rails together at said generally parallel center portions to define a cruciform frame having a shaft tunnel defined by said depressed and folded center portions.

7. A method of manufacturing a cruciform vehicle frame having a drive shaft tunnel passing through the center section thereof, said method comprising the steps of forming a pair of tubular rails having a rectangular cross section, displacing the center sections of said rails horizontally to provide center portions generally parallel to and offset from the end portions thereof, depressing the outer side wall of each of said rail center portions to form a reinforcing bead at the upper and lower edges thereof, depressing the inner side wall of each of said rail center portions to fold said wall into area contact with said outer wall, and securing said rails together in spaced relation at said parallel center portions to define a cruciform frame having a shaft tunnel defined by said depressed and folded center portions.

8. A vehicle frame tunnel section comprising a pair of side walls and a top plate and a bottom plate, each of said tunnel side walls being formed from a generally rectangular tubular side rail having oppositely disposed sides and top and bottom portions, said side rails each having one side thereof folded against the other side thereof and said portions collapsed against themselves in the central portion of said tunnel section to provide a substantially L-shaped cross section at said tunnel section, said side rails being secured together in transverse spaced relation by said plates.

References Cited in the file of this patent
UNITED STATES PATENTS

| | | |
|---|---|---|
| 1,734,710 | Borchert | Nov. 5, 1929 |
| 2,077,454 | Almdale | Apr. 20, 1937 |
| 2,154,154 | Eklund | Apr. 11, 1939 |
| 2,165,074 | Sherman | July 4, 1939 |
| 2,177,991 | Maddock | Oct. 31, 1939 |
| 2,301,330 | Schafer | Nov. 10, 1942 |